United States Patent [19]

Merchel et al.

[11] Patent Number: 5,223,695
[45] Date of Patent: Jun. 29, 1993

[54] ELECTRIC CIGARETTE LIGHTER

[75] Inventors: Roland Merchel, Langen; Alexander Fischer, Bad Homburg; Gerhard Zeuner, Königstein; Günther Dietz, Wuppertal; Volker Dabringhaus, Wuppertal; Peter Wegel, Wuppertal, all of Fed. Rep. of Germany

[73] Assignee: Schoeller & Co. Elektrotechnische Fabrik GmbH & Co., Frankfurt, Fed. Rep. of Germany

[21] Appl. No.: 735,384

[22] Filed: Jul. 24, 1991

[30] Foreign Application Priority Data

Jul. 24, 1990 [DE] Fed. Rep. of Germany ....... 4023473

[51] Int. Cl.$^5$ ............................................. F23Q 7/00
[52] U.S. Cl. .................................. 219/264; 219/262; 219/267
[58] Field of Search ...................... 219/260–270

[56] References Cited

U.S. PATENT DOCUMENTS

| | | | |
|---|---|---|---|
| 1,736,544 | 11/1929 | Mead | 219/263 |
| 1,803,361 | 5/1931 | Stearns | 219/262 |
| 2,244,233 | 6/1941 | Ashton | 219/262 |
| 2,310,029 | 2/1943 | Kline | 219/264 |

FOREIGN PATENT DOCUMENTS

| | | | |
|---|---|---|---|
| 3019323 | 10/1981 | Fed. Rep. of Germany | 219/264 |
| 3241173 | 5/1983 | Fed. Rep. of Germany | 219/264 |

Primary Examiner—Anthony Bartis
Attorney, Agent, or Firm—Herbert L. Lerner; Laurence A. Greenberg

[57] ABSTRACT

The electric cigarette lighter combines the handling advantages of rotating operation with the contacting advantages of pressing operation. A shaft is rotationally fixed to a rotary knob but axially slidable with respect thereto. A heater body affixed to the shaft is brought from an initial position to an operating position through a rotating movement of the rotary knob and a superimposed rotary thrust movement of the shaft. The heater body is automatically returned from the operating position to to the initial position through likewise superimposed rotary thrust spring forces of one or two restoring springs.

26 Claims, 4 Drawing Sheets

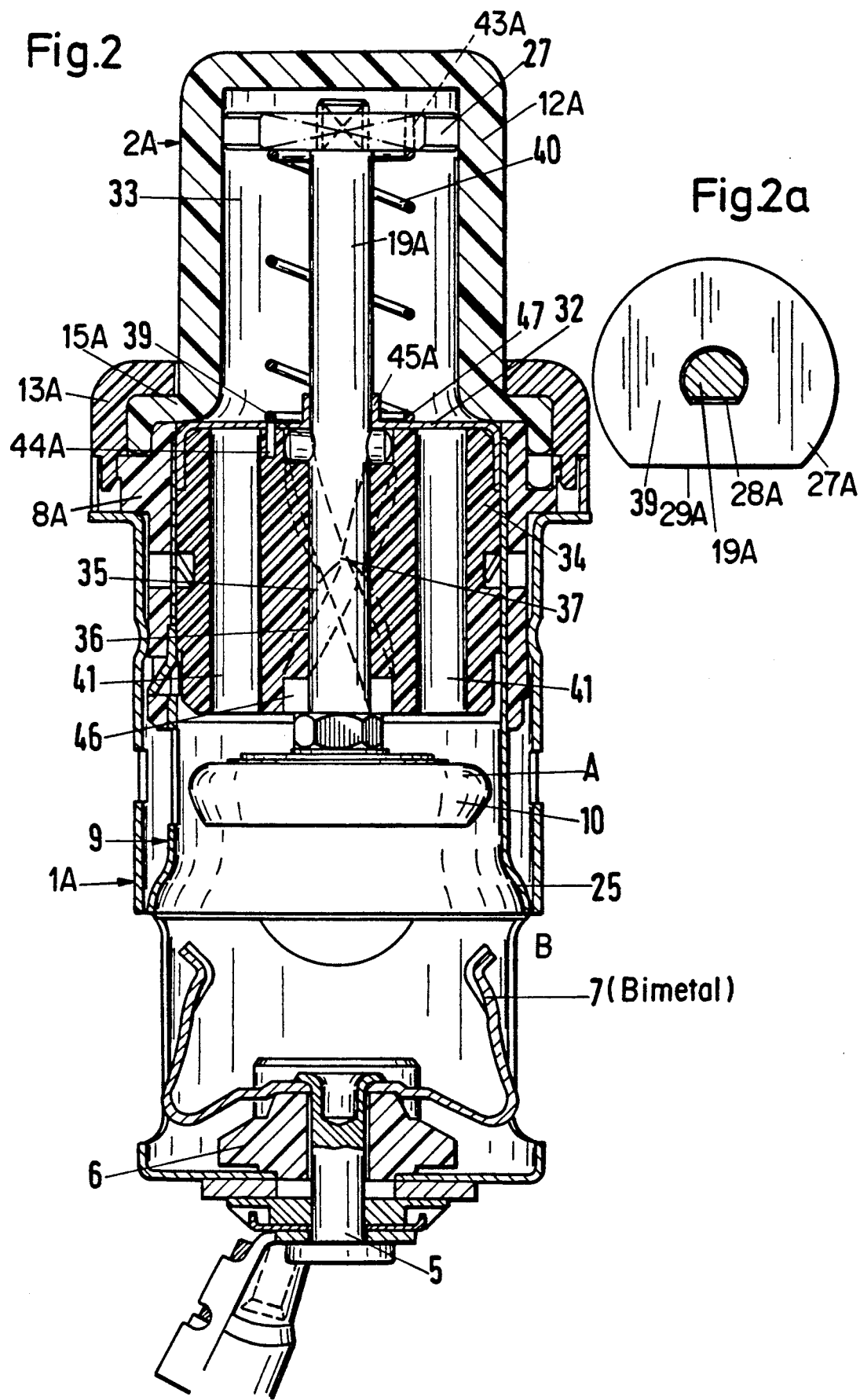

ELECTRIC CIGARETTE LIGHTER

The invention relates to an electric cigarette lighter, in particular to be installed in a dashboard of a motor vehicle, including a plug socket for a plug insert, having a shaft with an actuating knob on one end and a heater body on the other end being brought counter to a restoring action of a first restoring spring that can be strained torsionally, from an initial position into an operating position in which it locks in place, preferably with the aid of a bimetallic spring, and from which it returns automatically to the initial position by spring force once heating has occurred, and a plug insert holder being fixed on the plug socket upon insertion into the plug socket so as to be fixed against relative rotation and relative to which the shaft is axially displaceably disposed, and the shaft cooperating with aids for generating a rotary and thrusting motion for axially displacing the shaft upon a rotary motion of the actuating knob.

Many forms of cigarette lighters are known in which a heater body that is subject to spring pressure is pressed inwardly from outside by means of an actuation button between bimetallic springs, in order to close an electrical contact in a heating current circuit of the heater body. Once the bimetallic springs have attained a certain tripping temperature, they relax and release the heater body. The heater body then springs back to its initial position under the influence of the restoring force of a restoring body. One advantage of such pressure-actuated cigarette lighters is good contact closure and above all secure contact separation.

However, pressing an actuation button inward is also disadvantageous for several reasons. For instance, the user may break a fingernail when pushing in the actuation button. In the case of cigarette lighters installed in drawer-type vehicle ashtrays, it is also a disadvantage that the inward pressing direction of the actuation knob largely coincides with the insertion direction of the ashtray. Then, it is possible for the ashtray to be closed instead of the cigarette lighter being activated, and the user's finger may become caught in it in the process.

Cigarette lighters are therefore also known that can be turned on only by a rotary movement of the actuation knob. Then the heating element is locked in its on position until such time as the necessary incandescent temperature has been attained. A temperature sensor, preferably a bimetallic spring, then releases the lock, so that the heating element and the actuation knob are rotated together back to their initial position by means of a restoring spring. The advantage in that case is that in contrast to pressure-actuatable cigarette lighters, the heating element in the restoring process cannot be spun axially out of the lighter socket.

U.S. Pat. No. 2,310,029 discloses a cigarette lighter in which a thermal switch is provided with bimetallic strips and with restoring springs. The heating element is held by contact prongs until such time as the lighter plug has been pulled out of the lighter socket.

In contrast, in cigarette lighters known from German Patents DE-PS 30 19 323 and 32 41 173, the bimetallic springs acting upon an ashtray collar with the built-in heating element, are used to release the lock. Contact terminals that cooperate with the bimetallic spring are therefore located in the ashtray collar and are released by the spring once the heating element has attained the necessary lighting temperature. A tension spring can then return the heating element and the knob to the off position.

German Published, Non-Prosecuted Application DE-OS 39 24 560, which was published after the effective filing date of the instant application, describes a cigarette lighter in which a rotary motion of an actuation knob can be transmitted to a shaft that is connected to it in such a manner as to be fixed against relative rotation but axially displaceable, while the shaft carries the heater body on its free end. Two shaped bodies with ramp-like protrusions resting on one another are provided for axial displacement of the shaft. A first one of the bodies is rigidly joined to the shaft, while a second one is rigidly joined to a plug insert cylinder. The return of the heater body, which is guided to its operating position by means of a superimposed rotary and thrusting motion, is effected with a restoring spring that is subjected to torsional strain. In order to overcome the relatively high frictional forces arising upon restoration at the shaped bodies, the restoring spring, which can only be strained torsionally, must have a high spring force. In order to overcome the spring force, the user must in turn exert major effort to put the cigarette lighter in its on position.

It is accordingly an object of the invention to provide an electric cigarette lighter, which overcomes the hereinaforementioned disadvantages of the heretofore-known devices of this general type and which improves the manipulability of the cigarette lighter in such a way that it can be actuated relatively easily, and nevertheless its automatic return to the initial position is assured with high reliability.

With the foregoing and other objects in view there is provided, in accordance with the invention, an electric cigarette lighter, in particular one to be installed in a dashboard of a motor vehicle. The cigarette lighter comprises a plug socket and a plug insert to be disposed in the plug socket. The plug insert has a shaft with two ends, an actuating knob disposed on one of the ends of the shaft and a first restoring spring to be strained torsionally. A heater body is disposed on the other of the ends of the shaft for bringing the heater body counter to a restoring action of the first restoring spring from an initial position into an operating position in which the heater body is locked in place, preferably by a bimetallic spring. The first restoring spring automatically returns the heater body from the operating position to the initial position by spring force once heating has occurred. A plug insert holder is fixed on the plug socket against relative rotation upon insertion into the plug socket. The shaft is axially displaceably disposed relative to the plug insert holder. Means are provided which cooperate with the shaft for generating a rotary and thrusting motion for axially displacing the shaft upon a rotary motion of the actuating knob. A coupler is secured to the shaft. A second restoring spring is to be strained compressively, the second restoring spring being coaxial with the shaft, engaged by the coupler and compressed into the operating position with an axial thrusting motion of the shaft upon rotation of the actuating knob. The second restoring spring cooperates with the first restoring spring, whereby the rotary and compressive spring forces are superimposed on one another for returning the shaft from the operating position into the initial position.

With the objects of the invention in view, there is also provided an electric cigarette lighter, in particular to be installed in a dashboard of a motor vehicle, comprising a plug socket, a plug insert to be disposed in the plug socket, the plug insert having a shaft with two ends, an actuating knob disposed on one of the ends of the shaft, a restoring spring to be strained tortionally and compressively, a heater body disposed on the other of the ends of the shaft for bringing the heater body counter to a restoring action of the restoring spring from an initial position into an operating position in which the heater body is locked in place, preferably by a bimetallic spring, the restoring spring automatically returning the heater body from the operating position to the initial position by spring force once heating has occurred, a plug insert holder being fixed on the plug socket against relative rotation upon insertion into the plug socket, the shaft being axially displaceably disposed relative to the plug insert holder, means cooperating with the shaft for generating a rotary and thrusting motion for axially displacing the shaft upon a rotary motion of the actuating knob, a coupler secured to the shaft, the restoring spring being coaxial with the shaft, engaged by the coupler and compressed into the operating position with an axial thrusting motion of the shaft upon rotation of the actuating knob, and the rotary and compressive spring forces being superimposed on one another for returning the shaft from the operating position into the initial position.

The easier adjustability of the cigarette lighter is substantially obtained by using two spring forces that are superimposed on one another, with both a rotary force and a thrusting force being generated. The superimposed spring forces can be better adapted to the rotary and thrusting motion of the shaft, so that lesser overall actuating forces are needed.

In accordance with another feature of the invention, as an aid or means for generating a rotary and thrusting motion of the shaft, two shaped bodies are provided that have ramp-like protrusions, with which they rest on one another in the manner of inclined planes. A first shaped body is rigidly joined to the shaft, and a second shaped body is rigidly joined to the plug insert cylinder. The rotary motion of the rotary knob is thus converted, through an inclined plane, into an axial motion of the shaft carrying the heating element. Since it is well known that every screw thread is a wound, inclined plane, the invention can be realized even if a thread, preferably a steep-pitch thread, is used. The essential factor is that by means of the rotary motion of the rotary knob, an axial adjustment of the heater body until it reaches the detent position for turning on the heater body takes place.

In accordance with a further feature of the invention, the aids or means serving to produce the rotary and thrusting motion are structured in such a way that a cylindrical shaped body is disposed inside the plug insert cylinder and is provided with an axially extending central bore and screw-thread grooves. A guide pin that transversely penetrates the shaft engages the screw-thread grooves of the shaped body with its ends. A rotary motion exerted upon the shaft therefore simultaneously effects an axial change in position.

In accordance with an added feature of the invention, for easy actuation of the cigarette lighter, the shaped bodies are made of a slidable material, preferably ceramic or plastic.

In accordance with an additional feature of the invention, it is possible to economize on material and weight in the region of the shaped bodies if they are provided with suitably disposed recesses.

In accordance with yet another feature of the invention, the cap-shaped rotary knob does not go along with the axial motions of the shaft but instead has a centrally disposed bearing bush that in turn enables an axially extending guidance of the shaft. The coupler can then be mounted in such a manner as to be fixed against relative rotation and thrust, on the end of the shaft located in the bearing bush. Inside the bearing bush, it is disposed in such a manner as to be fixed against relative rotation, but axially displaceable.

In accordance with yet a further feature of the invention, the shaft has a first flattened portion that form-lockingly engages the coupler, and the coupler has a second flattened portion fitting form-lockingly into the bearing bush, with the second flattened portion resting on a sliding surface of the bearing bush and enabling an axial sliding motion.

In accordance with yet an added feature of the invention, there is provided only a single restoring spring that is strained compressively and torsionally and is disposed inside a recess in the rotary knob, preferably inside the bearing bush, between the coupler and a stop.

In accordance with yet an additional feature of the invention, there are provided first and second restoring springs, the first spring can be strained torsionally and the second spring can be strained compressively, the second restoring spring is disposed inside a recess in the rotary knob corresponding to the single restoring spring, and the first restoring spring is disposed outside the bearing bush and concentric with it.

In accordance with again another feature of the invention, all of the restoring springs are helical springs.

In accordance with again a further feature of the invention, there is provided a metal guide baffle between the plug insert cylinder and the shaft for producing an electrical connection. This is done in order to permit the use of non-metallic materials with low sliding friction for the shaped bodies as well. In this way, the current circuit to the heater body is closed.

In accordance with again an added feature of the invention, the plug insert or the plug insert cylinder has a collar that cooperates in a form-locking or at least friction-locking manner with the flange of the plug socket, so as to prevent joint rotation of the plug insert cylinder during the rotary actuation of the rotary knob.

In accordance with again an additional feature of the invention, there is provided an annular housing in which the rotary knob is supported in a rotationally movable but thrust-free manner, for joining the cup-shaped rotary knob which is supported in a rotationally-movable manner to the plug insert cylinder.

In accordance with a concomitant feature of the invention, the annular housing is coupleable to the plug insert cylinder in a force-locking and/or form-locking manner, in order to assure easy installation of the rotary knob.

Other features which are considered as characteristic for the invention are set forth in the appended claims.

Although the invention is illustrated and described herein as embodied in an electric cigarette lighter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 2a a partly cross-sectional view of a coupler of FIG. 2; and

Figure 2B:
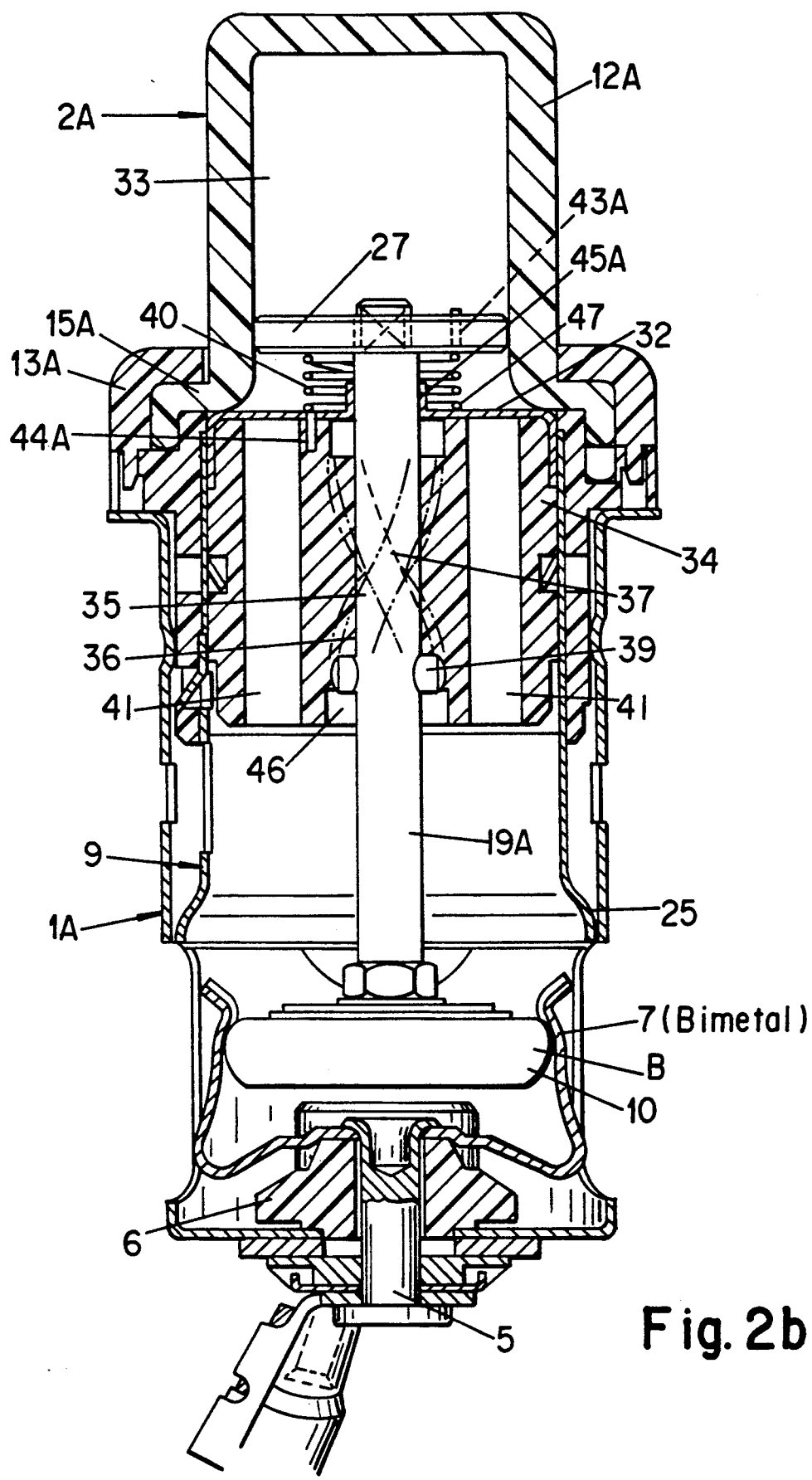
FIG. 2 is another partly broken-away, medial longitudinal-sectional view of a cigarette lighter according to a second exemplary embodiment.

FIG. 2b is a view showing the lighter of FIG. 2 with the heater body thereof axially displaced to its operating position.

Figure 1:
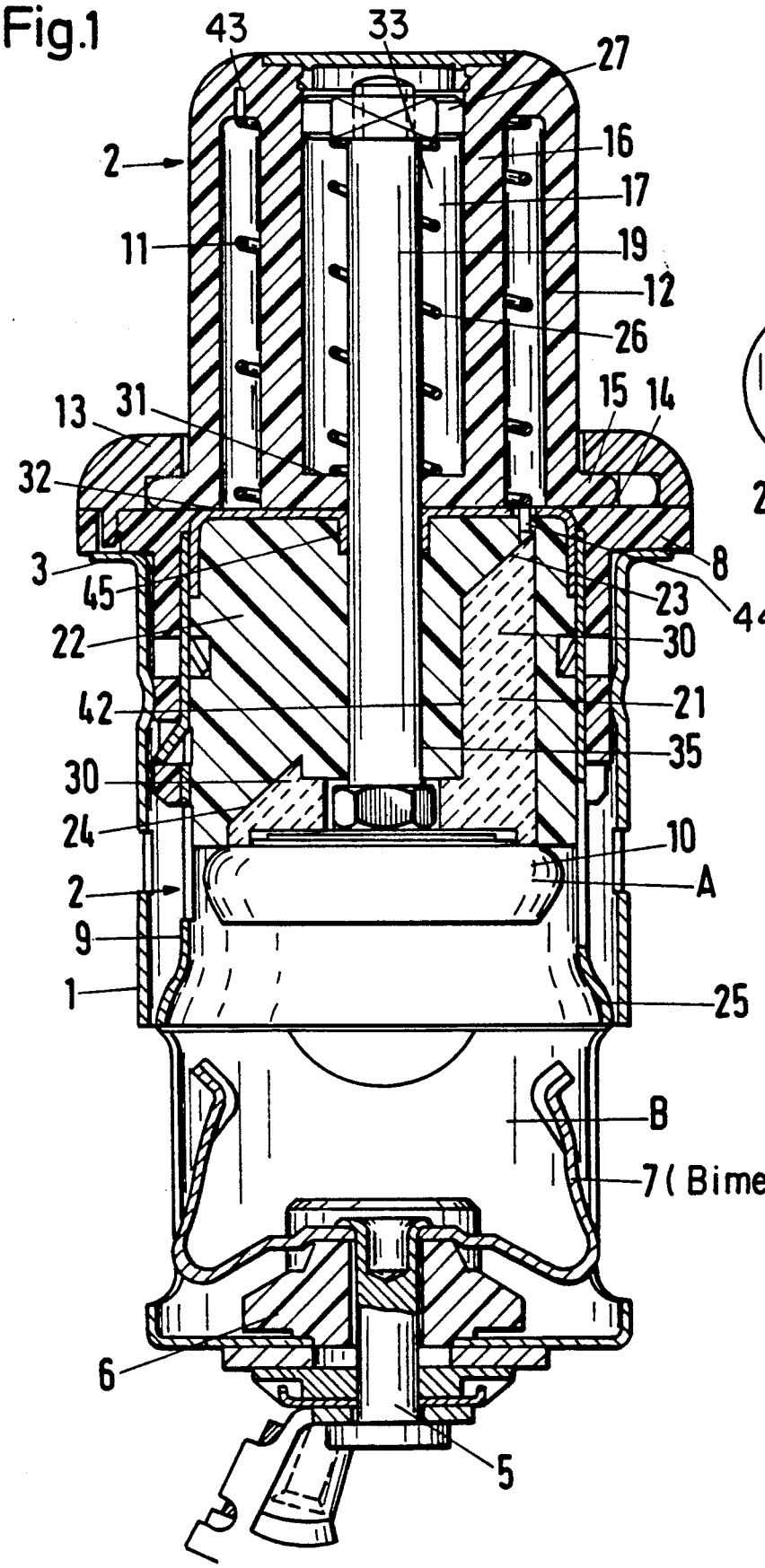
FIG. 1 is a diagrammatic, partly broken-away, medial longitudinal-sectional view of a cigarette lighter according to a first exemplary embodiment of the invention.

Referring now to the figures of the drawing in detail and first, particularly, to FIG. 1 thereof, there is seen a longitudinal section through the cigarette lighter of the invention, having a receptacle housing which is constructed as a plug socket 1, which is retained, for instance, in a non-illustrated vehicle ashtray and which has a plug insert 2 that can be inserted into the plug socket 1.

The plug socket 1 has a flange 3 at an open side thereof, which is supported on a housing wall of an ashtray or the like. The bottom of the plug socket 1 carries a typical bimetallic spring 7, through the use of a rivet 5 and an insulator 6. The plug insert 2 has a plug insert cylinder 9 which is provided with a collar 8 and a flared lower end 25. A heater body 10 is axially displaceable out of a starting position A into an operating position B relative to the plug insert cylinder 9, in response to a rotary and thrusting motion of a shaft 19 initiated by a rotary motion of a rotary knob 12. The motion of the heater body 10 is counter to the action of first and second restoring springs 11, 26.

The collar 8 is constructed as a separately manufactured annular housing 13, which is preferably made of plastic, is rigidly joined to the plug insert cylinder 9, and has an annular groove 14 for rotationally movable support of the rotary knob 12 which is provided with a flange 15.

The cap-shaped rotary knob 12 is provided with a centrally disposed bearing bush 16, in which the shaft 19 undergoes an axial guidance, by means of a coupler, driver or dog 27 secured to it. The bearing bush 16 has a recess 33 for the second restoring spring 26. A free end of the shaft 19 carries the heater body 10, and a shank thereof carries a first shaped body 21 which is rigidly disposed thereon. A second shaped body 22 is rigidly secured in the plug insert cylinder 9. The shaped bodies 21, 22 rest on one another with ramplike protrusions 23, 24, in such a way that upon a rotary motion of the rotary knob 12, an axial displacement of the shaft 19 and thus of the heater body 10 is established, counter to the force of the restoring springs 11, 26.

The compulsory guidance of the two shaped bodies 21, 22 is particularly good because the central bore 35 provided in the second shaped body is relatively long, and because the first shaped body 21 has projections 30 at the ramp-like protrusions 23, 24. The projections form-lockingly engage a groove guide 42 in the second shaped body 22. A form-locking connection is one which connects two elements together due to the shape of the elements themselves, as opposed to a force-locking connection, which locks the elements together by force external to the elements. In order to enable the shaped bodies 21, 22 to be made of materials that slide well on one another, such as ceramic or plastic, a metal guide baffle or plate 32 that establishes an electrical connection is provided between the plug insert cylinder 9 and the shaft 19. The metal guide baffle 32 has a collar 45.

A particularly reliable restoring mechanism is attained if the second restoring spring 26 can stressed compressively and wound around the shaft 19 that carries the heater body 10. One end of this spring 26 is supported on the bottom 31 of the bearing bush 16 which forms a stop and its other end is supported on the coupler 27 that is secured to the shaft 19. The first restoring spring 11, which can be torsionally strained, has a first end 43 that is anchored in the inner wall of the rotary knob 12 and a second end 44 that is anchored in the second shaped body 22.

The effect of the two restoring springs 11, 26 is that after the heater body 10 is released by the bimetallic spring 7, it is automatically restored from the operating position B to the starting or initial position A by a superimposed rotary and thrusting motion.

Figure 1A:
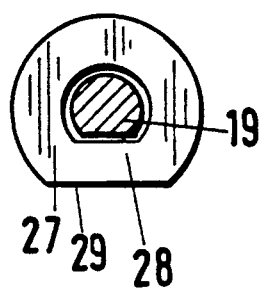
FIG. 1a is a partly cross-sectional view of a coupler of FIG. 1.
Figure 1B:
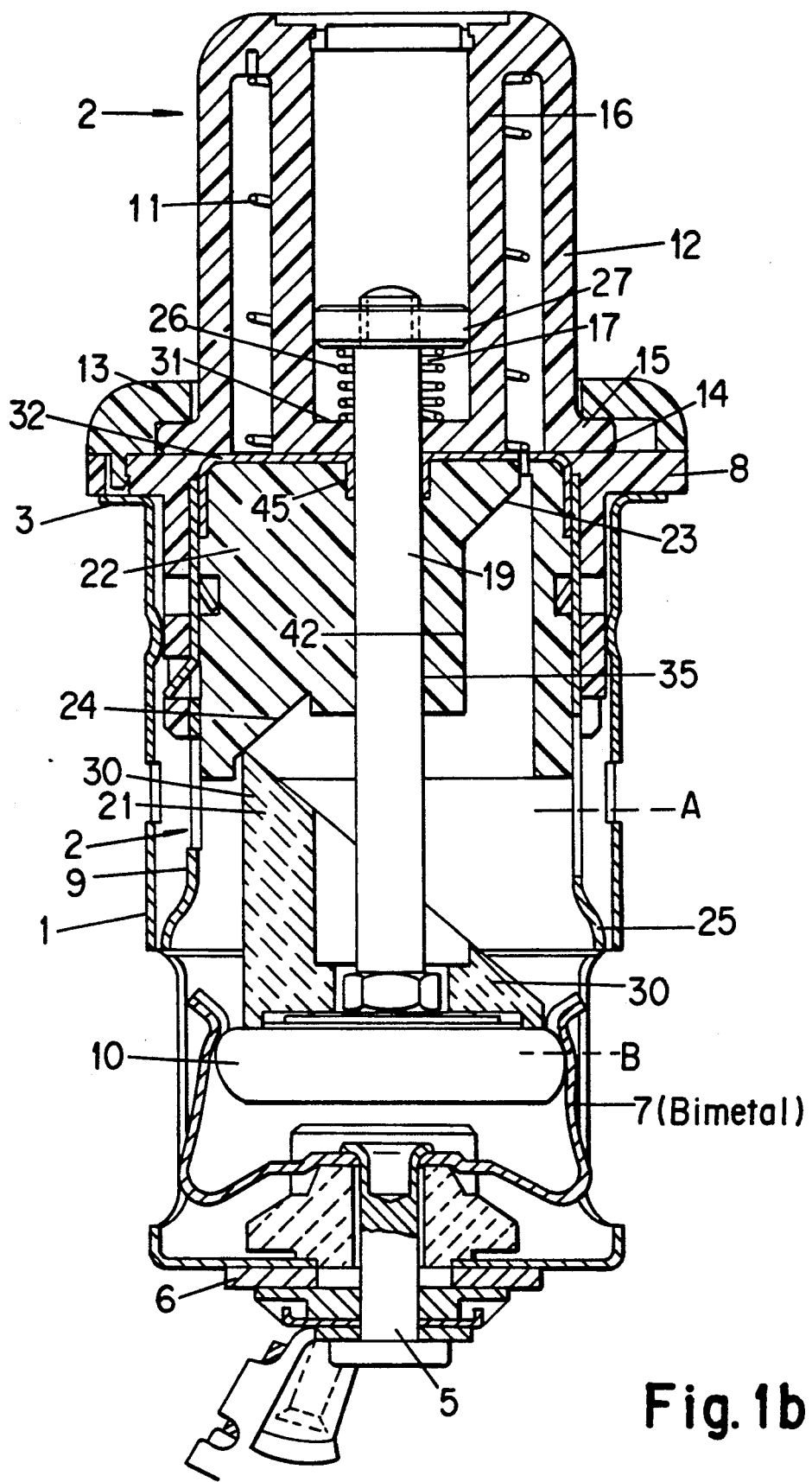
FIG. 1b is a view showing the lighter of FIG. 1 with the heater body thereof axially displaced to its operating position.

As is shown in FIG. 1a, the coupler 27 has a second flattened portion 29 which rests form-lockingly on an axially extending sliding surface 17 formed in the bearing bush 16. The rotary motion of the rotary knob 12 is transmitted by means of the second flattened portion 29 of the coupler 27 to the coupler 27 and from there it is transmitted to the shaft 19 by means of a form-lockingly engaging first flattened portion 28 on the shaft 19.

The cigarette lighter according to the first exemplary embodiment of the invention, functions as follows:

Beginning with the starting or initial position A, the rotary knob 12 is turned in the annular groove 14 of the annular housing 13 far enough, so that the heater body 10 disposed on the shaft 19 locks in the bimetallic spring 7 in the operating position B. Since the shaft 19 is connected with the bearing bush 16 of the rotary knob 12 through the coupler 27 in such a manner as to be fixed against relative rotation, the shaft 19 executes a rotary motion simultaneously with the rotary motion of the rotary knob 12. In addition, the coupler 27 slides axially downward toward the bimetallic spring 7 in the guide groove 17, since the first shaped body 21 rigidly joined to the shaft 19, with its ramp-like protrusion 23, undergoes a compulsory guidance along the ramp-like protrusion 24 of the second shaped body 22. In this process the coupler 27 compresses the second restoring spring 26. At the same time, the first restoring spring 11 is strained by torsion.

Once the heater body 10 locks into place in the bimetallic spring 7, the current circuit for heating a resistor wire disposed in the heater body 10 is closed. Once the bimetallic spring 7 has attained its release temperature, it releases the heater body 10 again. When the heater body 10 is released, it slides automatically back out of the operating position B into the initial position A under the influence of the restoring force of the two restoring springs 11, 26 with a rotary and thrusting motion, and in so doing it also rotates the rotary knob 12 back to its original position. Once the heater body 10 has attained its ignition temperature, the user of the cigarette lighter learns that the rotary knob 12 has snapped back both acoustically, due to an audible "release click", and visually.

Rotation of the plug insert cylinder 9 along with the rotational actuation of the rotary knob 12, is prevented by providing that the collar 8 of the plug insert cylinder 9 cooperates form-lockingly or at least friction-lockingly with the flange 3 or some other part of the plug socket 1.

FIG. 2 is a longitudinal section through the cigarette lighter according to a further exemplary embodiment of the invention. In FIG. 2, instead of two restoring springs as in the exemplary embodiment described above only a single restoring spring 40 is used. The spring 40 is disposed in a recess 33 in the rotary knob 12A and simultaneously performs the function of a compression spring and a torsion spring. To this end, the first end 43A of the single restoring spring 40 is supported on the coupler 27 and its second end 44A is supported on the metal guide baffle 32 serving as a stop and an electrical connector. The collar 45 of the baffle 32 rests on the shaft 19A carrying the heater body 10.

As FIG. 2a shows, the coupler 27A is rigidly joined to the shaft 19A by means of the first flattened portion 28 and is supported in the rotary knob 12A in such a manner as to be fixed against relative rotation but axially displaceable by means of the second flattened portion 29A.

A shaped body 34, which is preferably made of ceramic or plastic, is inserted in the plug insert cylinder 9 in such a manner as to be fixed against relative rotation and is covered by the baffle 32. A plurality of recesses 41 in the shaped body 34 that extend parallel to the shaft 19A, provide economy of material and weight. The shaft 19A protrudes all the way through the central bore 35 which is in the shaped body 34 and is supported in the central bore 35. Two screw thread grooves 37 being opposed to one another and each extending over 180 are provided on an inner wall surface 36 of the central bore 35, and a guide pin 38 passing through the shaft 19A protrudes at both of its ends 39 into the grooves 37, as shown in FIG. 2. The screw thread grooves 37 are constructed in such a way that upon rotation of the rotary knob 12, the shaft 19A is pressed downward, until the heater body 10 locks into place in the bimetallic spring 7 and in so doing executes a rotation about an angle of 180°. In the operating position B of the heater body 10, the guide pin 38 is located at a lower end 46 of the screw thread grooves 37, while in the initial or starting position A as shown, the guide pin 38 rests at an upper end 47 of the screw thread grooves 37. The bent ends 43A, 44A of the restoring spring 40 are anchored in the coupler or gland washer 27 and in the shaped body 34, so that upon rotation of the rotary knob 12A, exerts both a torsional force and a compressive force on the shaft 19. After the release of the heater body 10 by the bimetallic spring 7, these two forces assure that the heater body 10 along with the shaft 19A and the rotary knob 12A will snap back to its initial or starting position A.

We claim:

1. An electric cigarette lighter, comprising a plug socket, a plug insert to be removably disposed in said plug socket, said plug insert having a shaft with two ends, an actuating knob disposed on one of said ends of said shaft, a first restoring spring to be strained torsionally operatively connected to said actuating knob, a heater body disposed on the other of said ends of said shaft, said heater body being movable counter to a restoring action of said first restoring spring form an initial position into an operating position, said first restoring spring automatically returning said heater body from said operating position to said initial position by spring force once heating has occurred, a plug insert cylinder to be removably inserted into said plug socket, said plug insert cylinder including means for fixing said plug insert cylinder on said plug socket against relative rotation upon insertion into said plug socket, said shaft being axially displaceably disposed relative to said plug insert cylinder, means in said plug insert cylinder cooperating with said shaft for generating a rotary and thrusting motion for axially displacing said shaft and heater body disposed thereon to said operating position upon a rotary motion of said actuating knob, a coupler secured to said shaft for rotationally coupling said actuating knob and said shaft while allowing axial movement of said shaft, a second restoring spring to be strained compressively, said second restoring spring being coaxial with said shaft, engaged by said coupler and compressed into said operating position with an axial thrusting motion of said shaft upon rotation of said actuating knob, said second restoring spring cooperating with said first restoring spring, and said rotary and compressive spring forces being superimposed on one another for returning said heater body from said operating position into said initial position.

2. The electric cigarette lighter according to claim 1, including a bimetallic spring disposed in said plug socket for receiving said heater body and locking said heater body in place in said operating position.

3. The electric cigarette lighter according to claim 1, wherein said means for generating a rotary and thrusting motion include first and second shaped bodies with ramp-like protrusions resting on one another, said first shaped body being rigidly joined to said shaft and said second shaped body being rigidly joined to said plug insert cylinder.

4. The electric cigarette lighter according to claim 3, wherein said second shaped body has a groove guide, and said ramp-like protrusions have projections engagging said groove guide.

5. The electric cigarette lighter according to claim 3, wherein said shaped bodies are formed of a slidable material.

6. The electric cigarette lighter according to claim 5, wherein said slidable material is selected from the group consisting of ceramic and plastic.

7. The electric cigarette lighter according to claim 1, wherein said rotary knob is cap-shaped and has a centrally disposed bearing bush for an axially extended guidance of said shaft.

8. The electric cigarette lighter according to claim 7, wherein one of said ends of said shaft is disposed in said bearing bush and said coupler is fixed against relative rotation and thrust on said end of said shaft disposed in said bearing bush and said coupler is fixed against relative rotation but axially displaceable in said bearing bush.

9. The electric cigarette lighter according to claim 8, wherein said bearing bush has a sliding surface, said shaft has a first flattened portion locked to said coupler, and said coupler has a second flattened portion locked into said bearing bush, said second flattened portion resting on said sliding surface and enabling an axial sliding motion.

10. The electric cigarette lighter according to claim 7, including a stop disposed in said rotary knob, said second restoring spring being disposed inside a recess formed in said rotary knob, between said coupler and said stop, and said first restoring spring being disposed outside of and concentric with said bearing bush.

11. The electric cigarette lighter according to claim 10, wherein said recess is formed in said bearing bush.

12. The electric cigarette lighter according to claim 10, wherein said restoring springs are helical springs.

13. The electric cigarette lighter according to claim 1, including a metal guide baffle disposed between said plug insert cylinder and said shaft for establishing an electrical connection between said plug insert cylinder and said shaft for establishing an electrical connection.

14. The electric cigarette lighter according to claim 1, wherein at least one of said plug insert and said plug insert cylinder has a collar.

15. The electric cigarette lighter according to claim 1, including an annular housing locked to said plug insert cylinder, said rotary knob being supported in a rotationally movable but thrust-free manner in said annular housing.

16. An electric cigarette lighter, comprising a plug socket, a plug insert to be removably disposed in said plug socket, said plug insert having a shaft with two ends, an actuating knob disposed on one of said ends of said shaft, a restoring spring to be strained torsionally and compressively operatively connected to said actuating knob, a heater body disposed on the other of said ends of said shaft, means for bringing said heater body counter to a restoring action of said restoring spring from an initial position into an operating position, said restoring spring automatically returning said heater body from said operating position to said initial position by spring force once heating has occurred, said means for brining said heater body into said operating position including a plug insert cylinder disposed coaxially with said shaft, said plug insert cylinder including means for fixing said plug insert cylinder on said plug socket against relative rotation upon insertion into said plug socket, said shaft being axially displaceably disposed relative to said plug insert cylinder, means in said plug insert cylinder cooperating with said shaft for generating a rotary and thrusting motion for axially displacing said shaft and heater body disposed thereon upon a rotary motion of said actuating knob, a coupler fixedly disposed on said shaft for rotationally coupling said actuating knob and said shaft while allowing axial movement of said shaft, said restoring spring being coaxial with said shaft, engaged by said coupler and compressed into said operating position with an axial thrusting motion of said shaft upon rotation of said actuating knob, and said rotary and compressive spring forces being superimposed on one another for returning said shaft from said operating position into said initial position.

17. The electric cigarette lighter according to claim 16, including a bimetallic spring disposed on said plug socket for locking said heater body in place in said operating position.

18. The electric cigarette lighter according to claim 16, wherein said means for generating a rotary and thrusting motion include a cylindrical shaped body disposed inside said plug insert cylinder, said shaped body having an axially extending central bore with screw thread grooves formed therein, and a guide pin transversely penetrating said shaft and having ends engaging said screw thread grooves.

19. The electric cigarette lighter according to claim 18, wherein said shaped body is formed of a slidable material.

20. The electric cigarette lighter according to claim 19, wherein said slidable material is selected from the group consisting of ceramic and plastic.

21. The electric cigarette lighter according to claim 18, wherein said shaped body has a plurality of recesses formed therein for economizing on material and weight.

22. The electric cigarette lighter according to claim 16, including a stop disposed in said rotary knob, said restoring spring being disposed inside a recess formed in said rotary knob, between said coupler and said stop.

23. The electric cigarette lighter according to claim 22, wherein said restoring spring is a helical spring.

24. The electric cigarette lighter according to claim 16, including a metal guide baffle disposed between said plug insert cylinder and said shaft for establishing an electrical connection between said plug insert cylinder and said shaft.

25. The electric cigarette lighter according to claim 16, wherein at least one of said plug insert and said plug insert cylinder has a collar at which said plug insert and said plug insert cylinder come into mutual contact upon insertion of said plug insert in said plug insert cylinder.

26. The electric cigarette lighter according to claim 16, including an annular housing locked to said plug insert cylinder, said rotary knob being supported in a rotationally movable but thrust-free manner in said annular housing.

* * * * *